United States Patent
Takazawa

(10) Patent No.: US 10,453,176 B2
(45) Date of Patent: Oct. 22, 2019

(54) DISPLAY APPARATUS TO CONTROL DISPLAY FORM OF VIRTUAL OBJECT

(71) Applicant: Ricoh Company, Ltd., Tokyo (JP)

(72) Inventor: Kazuhiro Takazawa, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 57 days.

(21) Appl. No.: 15/799,443

(22) Filed: Oct. 31, 2017

(65) Prior Publication Data

US 2018/0137601 A1 May 17, 2018

(30) Foreign Application Priority Data

Nov. 15, 2016 (JP) .................................. 2016-222167

(51) Int. Cl.
*G06T 3/20* (2006.01)
*B60K 35/00* (2006.01)
(Continued)

(52) U.S. Cl.
CPC ................ *G06T 3/20* (2013.01); *B60K 35/00* (2013.01); *G02B 27/0101* (2013.01);
(Continued)

(58) Field of Classification Search
CPC ...... B60K 2350/106; B60K 2350/1084; B60K 35/00; B60K 2350/2052; B60K 2350/352; B60K 2350/965; B60K 2350/1072; G06T 3/20; G06T 3/60; G06T 2210/62; G06T 19/006; G02B 27/0101; G02B 2027/014; G02B 2027/0198; G02B 2027/0141
See application file for complete search history.

(56) References Cited

U.S. PATENT DOCUMENTS

| | | | |
|---|---|---|---|
| 2015/0193984 A1* | 7/2015 | Bar-Zeev | G02B 26/026 345/633 |
| 2015/0334269 A1* | 11/2015 | Yokota | G06K 9/00805 382/103 |

(Continued)

FOREIGN PATENT DOCUMENTS

| | | | | |
|---|---|---|---|---|
| JP | 2012-242465 | | 12/2012 | |
| JP | WO2015152304 | * | 10/2015 | ............... G08G 1/16 |

(Continued)

*Primary Examiner* — Mark K Zimmerman
*Assistant Examiner* — Phuc N Doan
(74) *Attorney, Agent, or Firm* — Xsensus LLP

(57) ABSTRACT

A display apparatus mountable on a mobile object, which: obtains a display location and a movement direction of a virtual object to be displayed in a display area of the display apparatus so as to be overlaid in a real world, the virtual object to be moved relative to movement of the mobile object; estimates a time it will take for the virtual object to move from the display location to a border of the display area, or a distance between the display location of the virtual object and the border of the display area, each based on the display location and the moving direction of the virtual object; determines a display form of the virtual object based on the estimated time or the estimated distance; and causes the virtual object be displayed in the determined display form, such that the virtual object changes the display form while moving in the display area.

14 Claims, 11 Drawing Sheets

(51) Int. Cl.
*G02B 27/01* (2006.01)
*G06T 3/60* (2006.01)
*G06T 19/00* (2011.01)

(52) U.S. Cl.
CPC .. *B60K 2370/152* (2019.05); *B60K 2370/155* (2019.05); *B60K 2370/1529* (2019.05); *B60K 2370/167* (2019.05); *B60K 2370/177* (2019.05); *B60K 2370/179* (2019.05); *B60K 2370/191* (2019.05); *B60K 2370/193* (2019.05); *B60K 2370/334* (2019.05); *B60K 2370/52* (2019.05); *G02B 2027/014* (2013.01); *G02B 2027/0141* (2013.01); *G02B 2027/0183* (2013.01); *G02B 2027/0198* (2013.01); *G06T 3/60* (2013.01); *G06T 19/006* (2013.01); *G06T 2210/62* (2013.01)

(56) References Cited

U.S. PATENT DOCUMENTS

| | | | | |
|---|---|---|---|---|
| 2016/0159280 A1* | 6/2016 | Takazawa | ............... | B60K 35/00 345/8 |
| 2018/0012087 A1* | 1/2018 | Imbe | ................ | B60R 21/00 |
| 2018/0059779 A1* | 3/2018 | Sisbot | ................ | B60R 1/00 |
| 2018/0090007 A1* | 3/2018 | Takemori | ................ | B60K 35/00 |
| 2018/0095542 A1* | 4/2018 | Mallinson | ................ | G06F 1/163 |

FOREIGN PATENT DOCUMENTS

| | | | | |
|---|---|---|---|---|
| JP | 2016-001464 | | 1/2016 | |
| JP | WO2017169081 | * | 10/2017 | ............... G09G 5/00 |

\* cited by examiner

DISPLAY APPARATUS TO CONTROL DISPLAY FORM OF VIRTUAL OBJECT

CROSS-REFERENCE TO RELATED APPLICATIONS

This patent application is based on and claims priority pursuant to 35 U.S.C. § 119(a) to Japanese Patent Application No. 2016-222167, filed on Nov. 15, 2016, in the Japan Patent Office, the entire disclosure of which is hereby incorporated by reference herein.

BACKGROUND

Technical Field

The present invention generally relates to a display apparatus, a display system, and a display control method.

Description of the Related Art

The head-up display (HUD), which is mountable on a mobile object such as a vehicle or aircraft, projects light to the windshield or combiner to form a virtual image in front of the driver's line of sight. Since the driver can easily view such information without changing his or her line of sight, the physical load on the driver tends to decrease, while suppressing occurrence of accidents that may be caused when the driver looks away.

SUMMARY

Embodiments of the present invention include a display apparatus mountable on a mobile object, which: obtains a display location and a movement direction of a virtual object to be displayed in a display area of the display apparatus so as to be overlaid in a real world, the virtual object to be moved relative to movement of the mobile object; estimates a time it will take for the virtual object to move from the display location to a border of the display area, or a distance between the display location of the virtual object and the border of the display area, each based on the display location and the moving direction of the virtual object; determines a display form of the virtual object based on the estimated time or the estimated distance; and causes the virtual object be displayed in the determined display form, such that the virtual object changes the display form while moving in the display area.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
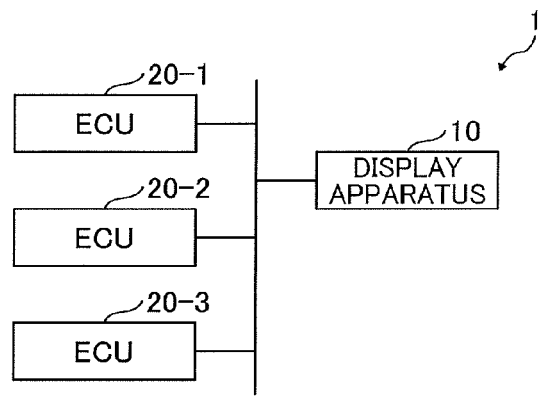
FIG. 1 is a schematic diagram illustrating a configuration of a display system according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

<System Configuration>

Referring to FIG. 1, a configuration of a display system 1 is described according to an embodiment. FIG. 1 is a schematic diagram illustrating a configuration of the display system 1 according to the embodiment.

As illustrated in FIG. 1, the display system 1, which may be mounted on a mobile object such as a vehicle, aircraft, or ship, includes a display apparatus 10 and one or more electric control units (ECUs) 20-1, 20-2, 20-3, etc. In the following, it is assumed that the display system 1 is mounted on the vehicle, however, the display system 1 may be applicable to any other mobile object.

The display apparatus 10 and the ECU 20 are connected through a network such as a control area network (CAN).

The display apparatus 10 may be, for example, a head-up display. Based on information obtained from the ECU 20, the display apparatus 10 displays various objects, such that the objects are overlaid on a real-world environment. Examples of such object include, but not limited to, an object having information regarding a real object such as an oncoming vehicle, and an object having navigation-related information to be used for guiding such as an instruction to turn right or left or a name of an intersection. Displaying an object on the real world (such as scenery) uses the augmented reality (AR) technology.

Figure 2:
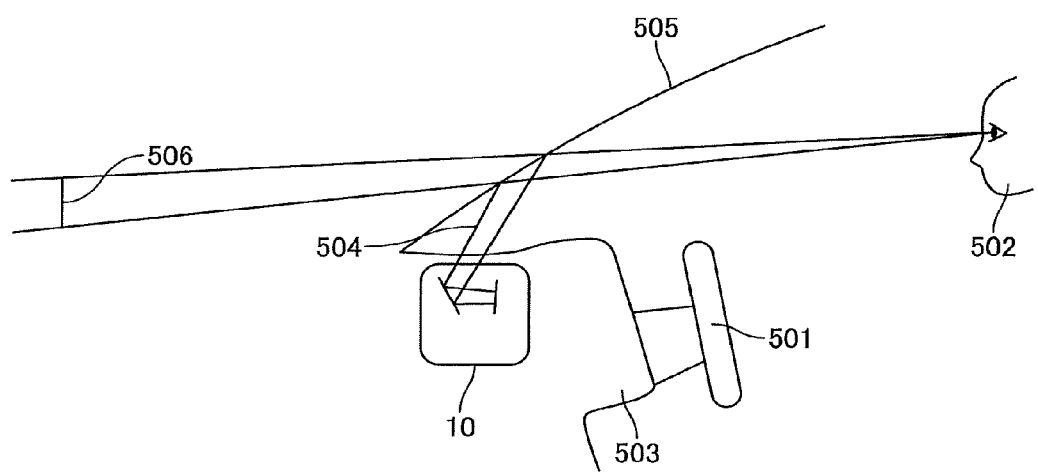
FIG. 2 is an illustration of an example arrangement of a display apparatus according to an embodiment.

FIG. 2 is an illustration of an example arrangement of the display apparatus 10, which is mounted on the vehicle. As illustrated in FIG. 2, the display apparatus 10 is disposed in a dashboard 503 of the vehicle, for example, at a position facing a driver 502 who sits in front of a steering wheel 501. That is, the display apparatus 10 is placed so as to display a virtual image ahead of a windshield 505 such that the driver 502 can see the virtual image without moving his or her line of vision, while looking straight in a traveling direction of the vehicle as the mobile object. The display apparatus 10 irradiates the windshield 505 with a projection light 504 through an opening (a projection opening) of the dashboard 503. The light reflected on the windshield 505 forms a virtual image on a display area 506, for display to the driver 502. In this embodiment, the display area 506 is an area where the virtual image is formed. More specifically, the display apparatus 10 includes an image forming unit that forms an image and an optical system that projects the image onto a transmission and reflection member, such as the windshield 505 of the vehicle, to display a virtual image of the image. The display apparatus 10 may form an intermediate image, and enlarges the intermediate image using a screen member such as a diffuser panel or a microlens array element to form a virtual image.

Figure 3:
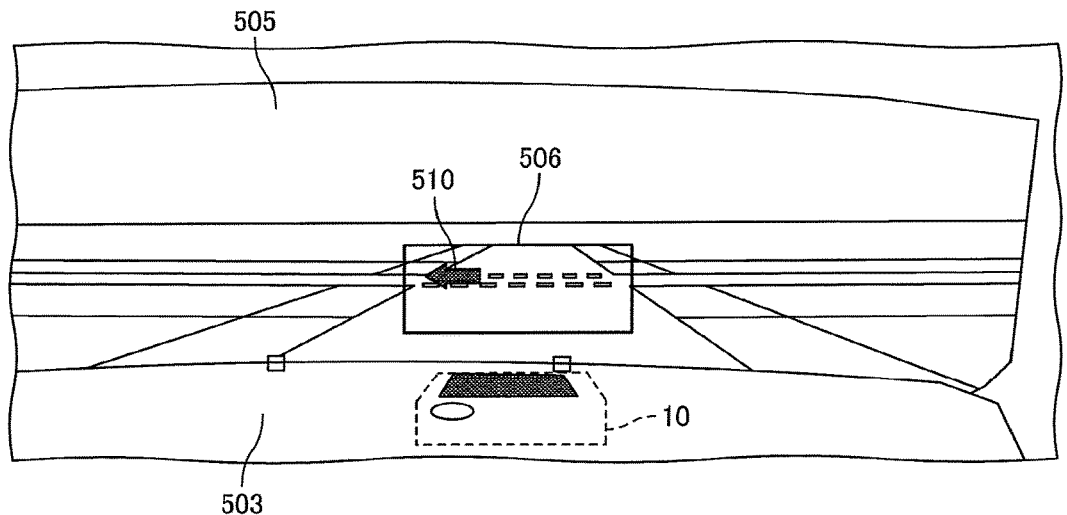
FIG. 3 is an illustration of a display area of the display apparatus of FIG. 2 according to an embodiment.

FIG. 3 is an illustration of the display area 506 of the display apparatus 10 according to an embodiment. As illustrated in FIG. 3, the display apparatus 10 displays a virtual object 510 on the display area 506, so as to be overlaid on the real world that can be seen via the windshield 505. The display apparatus 10 moves the virtual object 510 on the display area 506, relative to a location of a real object in the real world. For example, the virtual object 510 may be associated with a specific real object in the real world to move relative to the associated real object. Accordingly, the driver 502 perceives the virtual object 510 as it were physically present in the real world.

The ECU 20 transmits, to the display apparatus 10, various kinds of information including a driving speed of the vehicle, a turning angle of the wheel 501, an inclination of the vehicle such as a pitch or a roll, a location and a size of the virtual object 510 when displayed on the real world, and a type of the virtual object 510.

<Hardware Configuration>

Figure 4:
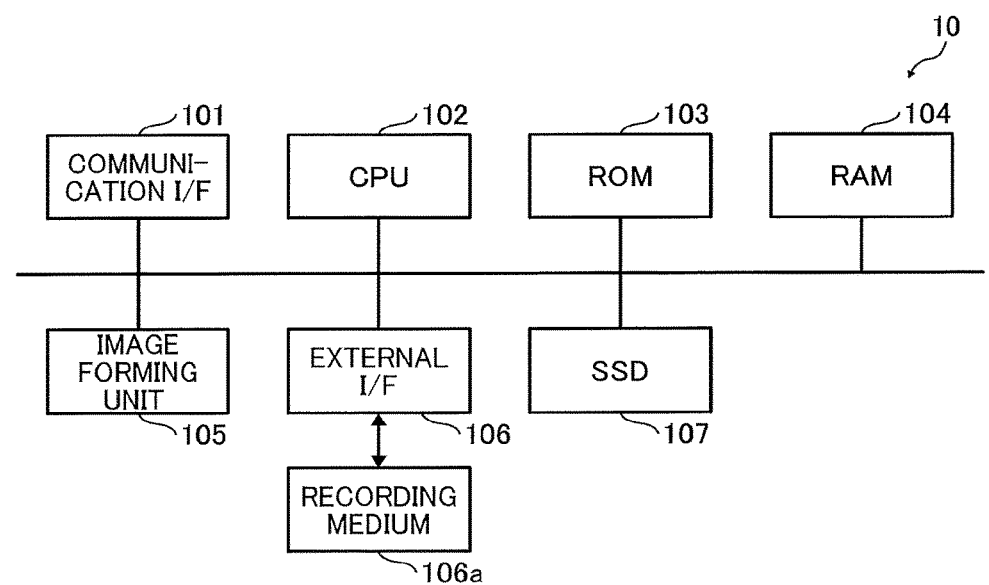
FIG. 4 is a schematic diagram illustrating a hardware configuration of the display apparatus of FIG. 2 according to the embodiment.

Referring to FIG. 4, a hardware configuration of the display apparatus 10 is described according to an embodiment. FIG. 4 is a schematic diagram illustrating a hardware configuration of the display apparatus 10 according to the embodiment.

The display apparatus 10 includes a communication interface (I/F) 101, a central processing unit (CPU) 102, a read only memory (ROM) 103, a random access memory (RAM) 104, an image forming unit 105, an external I/F 106, and a solid state drive (SSD) 107. These hardware components are connected through a bus B.

The communication I/F 101 is an interface that connects the display apparatus 10 to the network such as CAN.

The CPU 102 reads various programs or data from a memory such as the ROM 103 or SSD 107 onto the RAM 104, to perform processing according to the program or data to control entire operation or function of the display apparatus 10. In this embodiment, the CPU 102 reads a display control program stored in the ROM 103 or SSD 107 onto the RAM 104 to perform display control of the virtual object.

The ROM 103 is a nonvolatile semiconductor memory that keeps storing program or data even after power is turned off. The ROM 103 stores various programs or data relating to OS configurations, network configurations, and basic input/output system (BIOS) to be executed at the time of starting up the display apparatus 10. The RAM 104 is a volatile memory that temporarily stores programs or data.

The image forming unit 105 displays a processing result of the display apparatus 10, for example, on the display area 506. Examples of the image forming unit 105 include a projector that projects a projection light by laser, and a light emitting display such as a liquid crystal display (LCD), a digital micro-mirror device (DVD) panel, or a vacuum fluorescent display (VFD).

The SSD 107 is a nonvolatile memory that stores programs and data. The SSD 107 stores, for example, operating system (OS) as basic software for controlling entire operation of the display apparatus 10, and application software that provides various functions on the OS. The SSD 107 manages programs and data using any desired file system or database.

The external interface 106 is an interface that connects the display apparatus 10 with an external device. Examples of the external device include, but no limited to, a recording medium 106a. For example, the display apparatus 10 reads or writes from or to the recording medium 106a via the external I/F 106. The recording medium 106a may be implemented by, for example, a flexible disk, CD, DVD, SD memory card, and USB memory.

<Functional Configuration>

Figure 5:
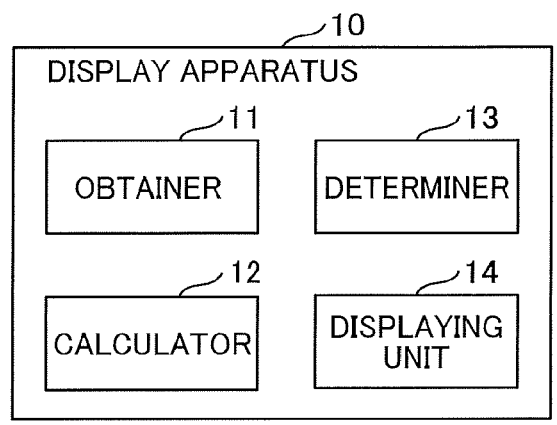
FIG. 5 is a schematic block diagram illustrating a functional configuration of the display apparatus of FIG. 1 according to the embodiment.

Referring to FIG. 5, a functional configuration of the display apparatus 10 is described according to the embodiment. FIG. 5 is a schematic block diagram illustrating a functional configuration of the display apparatus 10 according to the embodiment.

The display apparatus 10 includes an obtainer 11, a calculator 12, a determiner 13, and a displaying unit 14. The CPU 102 of the display apparatus 10 implements these functional units by performing various processing according to one or more programs installed on the display apparatus 10.

The obtainer 11 obtains, from the ECU 20, various kinds of information including a driving speed of the vehicle, a turning angle of the wheel 501, an inclination of the vehicle such as a pitch or a roll, a location and a size of the virtual object 510 when displayed on the real world, and a type of the virtual object 510.

In this example, the calculator 12 estimates a display location of the virtual object 510, according to movement of the vehicle caused by user operation (driver operation), and movement of the vehicle caused by disturbance. The movement of the vehicle caused by user operation is calculated using the driving speed of the vehicle and the turning angle of the wheel. The movement of the vehicle caused by disturbance is calculated using the inclination of the vehicle, i.e., the pitch or the roll. The calculator 12 estimates a movement direction of the virtual object 510, based on the location of the virtual object 510 on the real world, the driving speed of the vehicle, and the steering angle of the vehicle. The calculator 12 further estimates a movement speed of the virtual object 510 according to the driving speed of the vehicle.

In one example, the calculator 12 calculates a time it will take for the virtual object 510 to move to a border of the display area 506 (that is, an area displayable by the displaying unit 14), using the location of the virtual object 510 on the real world and the movement direction of the virtual object 510 on the real world. In another example, the calculator 12 calculates a distance between a current display location of the virtual object 510 and the border of the display area, for example, in pixel, using the location of the virtual object 510 on the real world and the movement direction of the virtual object 510 on the real world. The coordinate of the border of the display area 510 is previously stored in any desired memory accessible by the calculator 12.

The determiner 13 determines a display form of the virtual object 510 according to the time or distance calculated by the calculator 12.

The displaying unit 14 displays the virtual object 510 in the display form determined by the determiner 13, on the display area 506, to be overlaid on the real world.

Figure 6A:
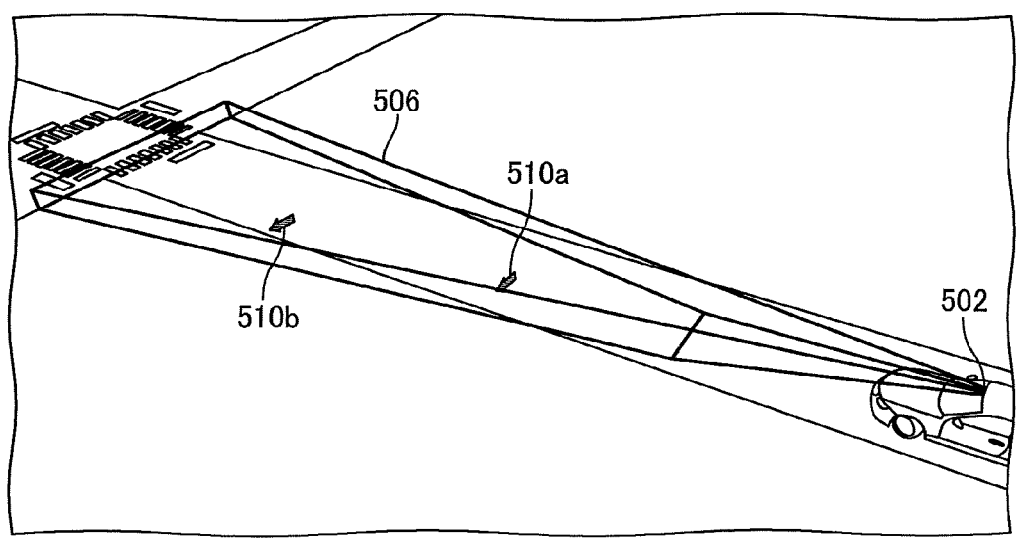
FIGS. 6A to 6C are illustrations of images displayed by the display apparatus using the augmented reality technology.
Figure 6B:
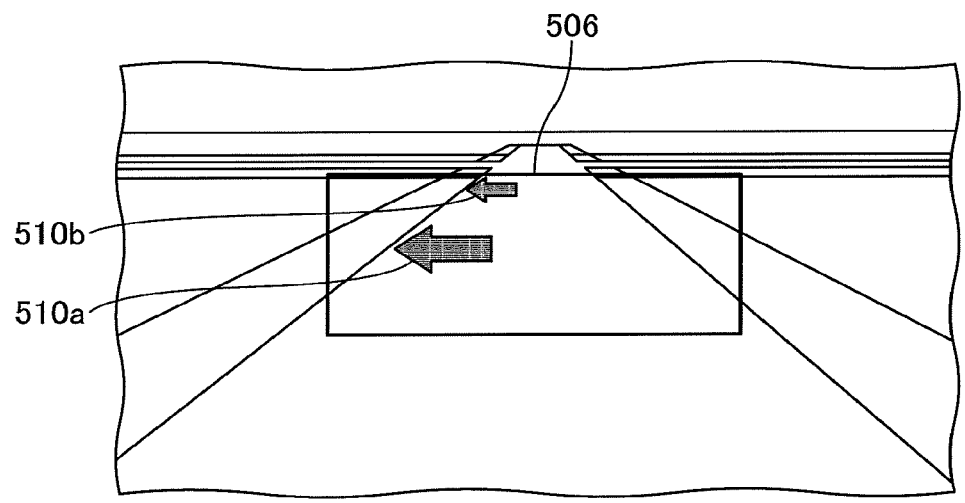
Figure 6C:
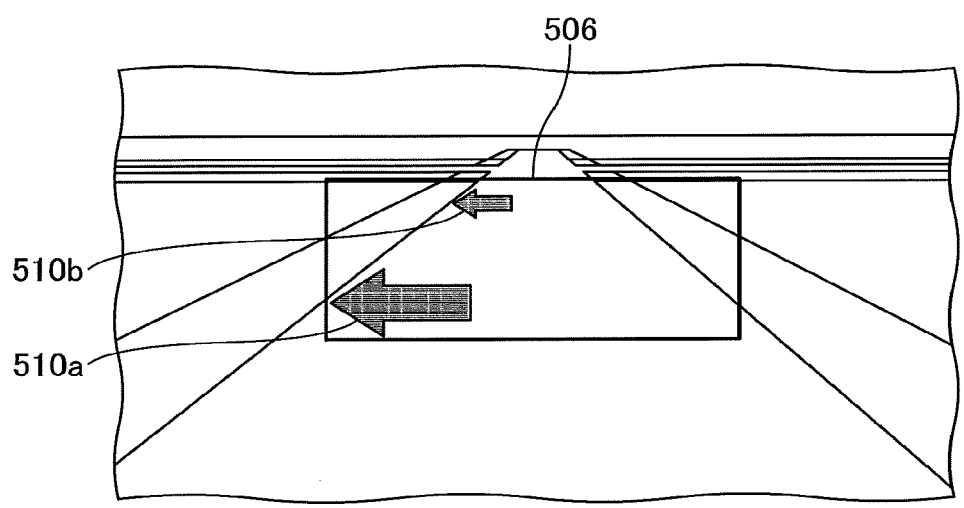

FIGS. 6A to 6C are an illustration of an image displayed by the displaying unit 14 using the augmented reality technology. As illustrated in FIG. 6A, the virtual objects (AR object) 510a and 510b are displayed on a virtual space having the same scalability with that of the real world. As illustrated in FIGS. 6B and 6C, when the vehicle moves with respect to the real object, the virtual image including the virtual objects 510a and 510b are kept displayed in the display area 506 while keeping the same relationship with the real object. Accordingly, the driver 502 perceives as the virtual objects 510a and 510b were moving with the real objects on the real world. Coordinate conversion between a coordinate of the real world space and a coordinate of the virtual world space (display area 506) may be performed using any desired known projection conversion method that may be generally used in 3D image processing.

The objects 510a and 510b, illustrated in FIGS. 6B and 6C, each instruct the driver 502 to turn left at the next intersection. The objects 510a and 510b are displayed, such that the objects 510a and 510b were disposed at a predetermined interval along the road surface. These objects 510a and 510b are displayed as they were stationary on the real world. As the vehicle moves forward along the road surface, the objects 510a and 510b are displayed such that they become closer to the driver 502. With movement of the vehicle, the objects 510a and 510b each move in the display area 506, in a direction from the top to the bottom, and eventually disappear from the display area 506.

In such case, if the objects 510a and 510b suddenly disappear at the border of the display area 506, the user becomes aware of a boundary between the real world space and the virtual world space. For example, the virtual object 510 may suddenly disappear from the display area 506 at the border, even when an entire area of the virtual object 510 does not finish crossing over the border of the display area 506.

In view of this, the display apparatus 10 displays the virtual object 510, such that it disappears from the display area 506 more smoothly, without causing the user (driver) to feel awkward.

<Operation>

Figure 7:
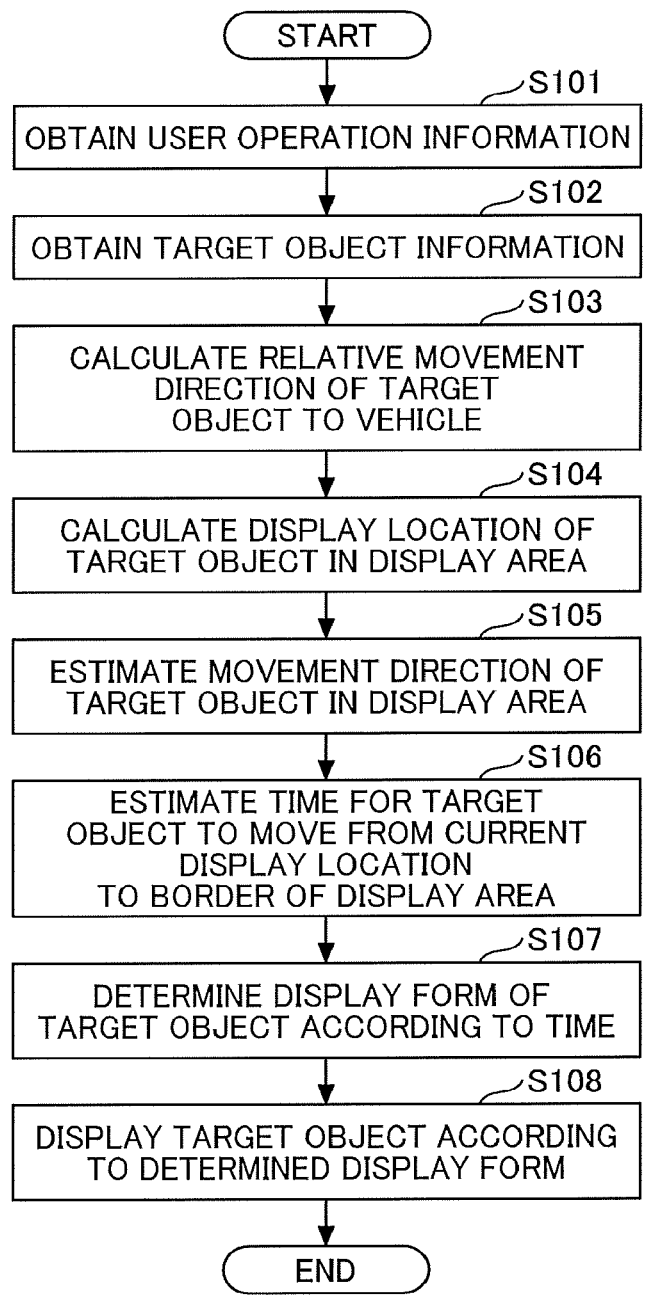
FIG. 7 is a flowchart illustrating operation of determining a display form of a target object according to a time it will take for the target object to move to the border of the display area, according to an embodiment.

Referring to FIG. 7, operation of controlling display of the virtual object 510, i.e., the target object, is described according to an embodiment. FIG. 7 is a flowchart illustrating operation of determining a display form according to a time it will take for the target object to move to the border of the display area, according to an embodiment. The operation of FIG. 7 may be performed, for example, every time the display apparatus 10 displays one frame of image data. In case there are more than one target object to be displayed, processing subsequent to S102 is performed for each object.

At S101, the obtainer 11 of the display apparatus 10 obtains user operation information. The user operation information includes, for example, information regarding a driving speed of the vehicle and a turning angle of the wheel, transmitted from any one of the ECUs 20-1 to 20-3.

The obtainer 11 of the display apparatus 10 obtains, from the ECU 20, information regarding the target object (S102). The target object is the virtual object 510 to be displayed on the display area 506. The information regarding the target object includes, for example, a location and a size of the target object when displayed on the real world.

The obtainer 11 of the display apparatus 10 calculates a relative movement direction of the target object with respect to the vehicle on the real world (S103). For example, the moving direction of the target object may be calculated using the user operation information that is obtained at S101.

The obtainer 11 of the display apparatus 10 calculates a display location of the target object in the display area 506 of the display apparatus 10 (S104). For example, the display location of the target object is calculated using the information regarding the target object.

The calculator 12 of the display apparatus 10 estimates a movement direction of the target object in the display area 506 of the display apparatus 10 (S105).

For example, if the target object is to be displayed as it were stationary in the real world, such as an object of navigation-related information that guides the driver, the calculator 12 calculates a path or trajectory (movement direction) of a display location of the target object as a function of time, according to the driving speed of the vehicle and the turning angle of the wheel. If the target object is to be displayed as it kept moving in the real world, such as an object of information regarding an oncoming vehicle, the calculator 12 calculates a path or trajectory (movement direction) of the target object as a function of time, according to the relative speed and the movement direction of the vehicle with the target object and the turning angle of the wheel. The speed and the movement direction of the target object may be measured using, for example, the stereo camera and the radar.

The calculator 12 of the display apparatus 10 estimates a time it will take for the target object to move from the current display location to the location of the border of the display area (S106). For example, the time it will take for the target object to move to the border of the display area may be obtained based on the trajectory (movement direction) of the display location of the target object over time, which is calculated at S105. The display apparatus 10 may calculate the time it will take for the target object to move to the border of the display area, while taking into account information regarding the acceleration speed of the vehicle.

The determiner 13 of the display apparatus 10 determines a display form of the target object based on the estimated time that is obtained at S106 (S107) More specifically, in this example, the determiner 13 determines a transparency of the target object, such that the transparency increases as the estimated time decreases.

The displaying unit 14 of the display apparatus 10 displays, in the display area 506, the target object in the determined display form (S108), and the operation ends.

Figure 8:
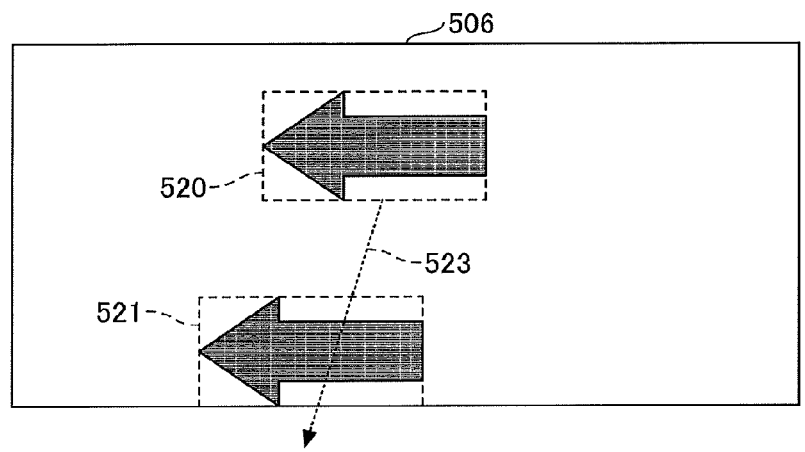
FIG. 8 is an illustration for explaining the change in display form of the target object according to a time it will take for the target object to move to the border of the display area, according to the embodiment.

Referring to FIG. 8, operation of determining a display form of the target object, performed at S107, is described according to the embodiment. FIG. 8 is an illustration for explaining operation of determining a display form according to a time it will take for the target object to move to the border of the display area, according to the embodiment.

When the target object, i.e., the virtual object 510, has a shape of arrow, which is complex, as illustrated in FIG. 8, the target object 510 may be considered as a rectangle, or a boundary, that surrounds the target object 510. In such case, the calculator 12 obtains a time it will take for the boundary of the target object 510 to move from a current location 520 to a location 521 at which a bottom part of the boundary of the target object 510 contacts the border of the display area 506, when the target object 510 moves in the direction of arrow 523. More specifically, the display apparatus 10 displays the target object 510 at the location 520 at a certain time. The display apparatus 10 then displays the target object 510 at the location 521 at a time after a time elapses from the certain time.

Figure 9A:
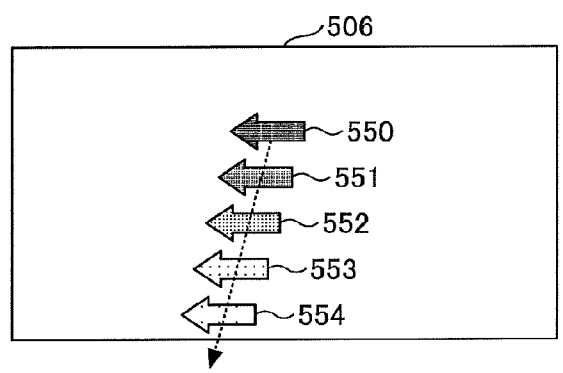
FIG. 9A is an illustration for explaining how the target object changes its display form over time, according to an embodiment.
Figure 9B:
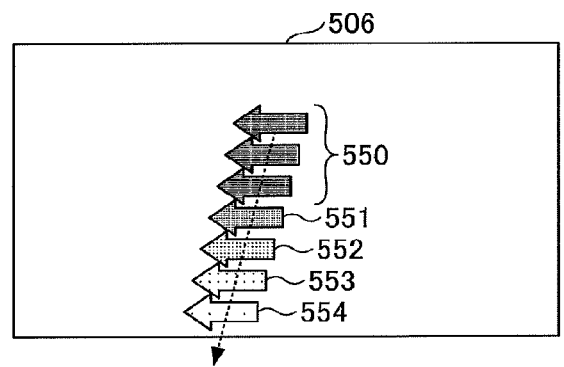
FIG. 9B is an illustration for explaining how the target object changes its display form over time, when the target object moves relatively slowly, according to an embodiment.

Referring to FIGS. 9A and 9B (FIG. 9), the change in display form of the target object over time is described according to an embodiment. FIG. 9 is an illustration for explaining how the target object changes its display form.

As illustrated in FIG. 9A, the determiner 13 of the display apparatus 10 changes a display form of the target object, with the decrease in estimated time for the target object to move to the border location. That is, the target object changes the display form, from the display form 550 to the display form 554, such that it becomes harder to be perceived by the user as the target object moves to the border of the display area 506. For example, the display form 550 has a transparency of 0%, and the display form 554 has a transparency of 80%. The display forms 551, 552, 553, and 554 have transparency values, which gradually increase in this order.

Further, in this example, the display form of the target object starts to change, when the estimated time reaches a certain value. For example, when the estimated time it will take for the target object to move to the border of the display area 506, becomes less than a predetermined value (such as 4 seconds), the displaying unit 14 starts to gradually increase transparency of the target object with the decreased estimated time, as indicated by the display form 550.

With this configuration, the target object is controlled to be displayed, such that the target object at the border of the display area 506 has transparency, which is set maximum. Accordingly, the user can hardly recognize the border of the display area 506, which is a boundary between the virtual world and the real world.

The time when the display form changes, i.e., the transparency changes, depends on various factors, such as the driving speed of the vehicle.

FIG. 9B illustrates the example case in which the target object slowly moves toward the border of the display area 506, compared to the example case illustrated in FIG. 9A. In such case, the displaying unit 14 starts to gradually increase transparency of the target object, after the target object reaches sufficiently close to the border of the display area 506.

More specifically, the target object having the display form 550 is displayed, when the estimated time it will take for the target object to move to the border of the display area 506 becomes less than a predetermined value (such as 4 seconds). Compared to the case illustrated in FIG. 9A, the display location of the display form 550 is closer to the border.

In the example illustrated in FIG. 8, a display form of the target object changes according to a time it will take for the target object to move to the border of the display area. Alternatively, in the following example, a display form of the target object may change according to a distance between a current display location of the target object and the border of the display area.

Figure 10:
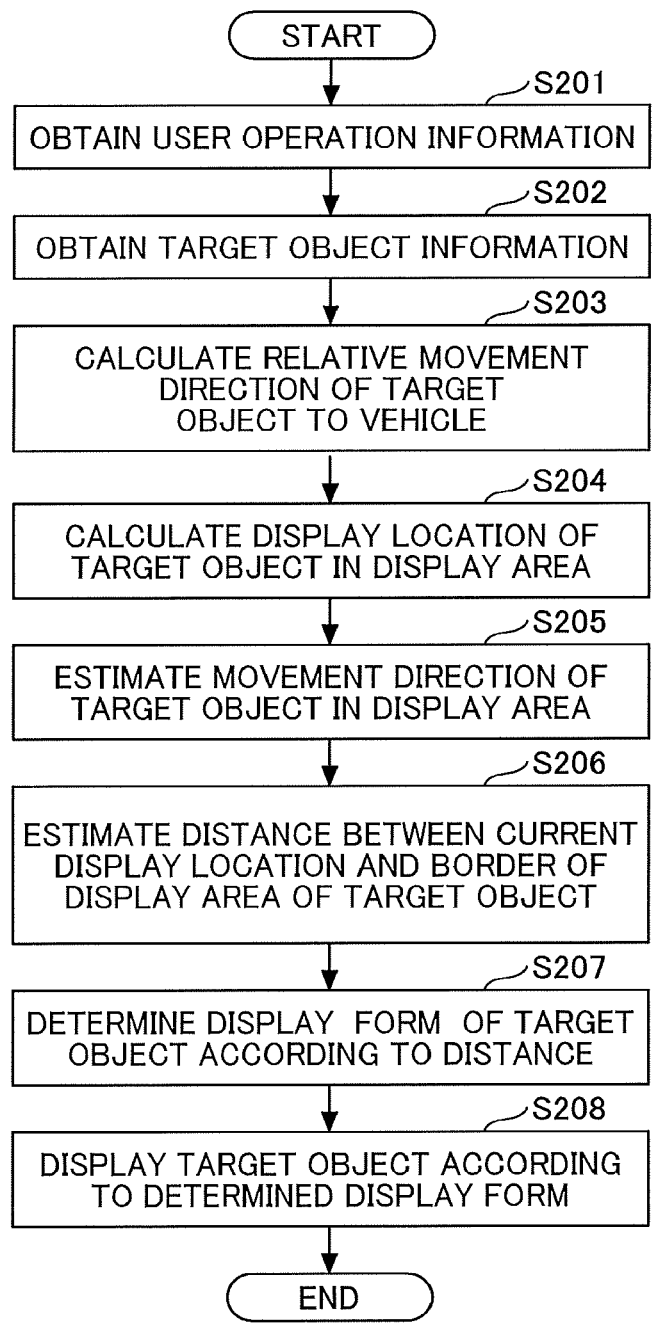
FIG. 10 is a flowchart illustrating operation of determining a display form of a target object according to a distance between a current display location of the target object and the border of the display area, according to an embodiment.

FIG. 10 is a flowchart illustrating operation of determining a display form according to a distance between a current display location of the target object and the border of the display area, according to an embodiment.

S201 to S205, and S208 are performed in a substantially similar manner as described above referring to S101 to S105, and S108 of FIG. 7. Accordingly, description thereof is omitted.

At S206, the calculator 12 of the display apparatus 10 calculates a distance between the current display location of the target object and the border of the display area 506 as a destination of the target object. For example, the distance of the target object between the current display location and the border of the display area 506 may be obtained based on the trajectory (movement direction) of the display location of the target object over time, which is calculated at S205. In this example, the distance in the display area 506 corresponds to a distance in pixel in case the image forming unit 105 is the LCD.

The determiner 13 of the display apparatus 10 determines a display form of the target object based on the estimated distance that is obtained at S206 (S207). More specifically, in this example, the determiner 13 determines a transparency of the target object based on the estimated distance, such that the transparency increases as the distance decreases.

Figure 11:
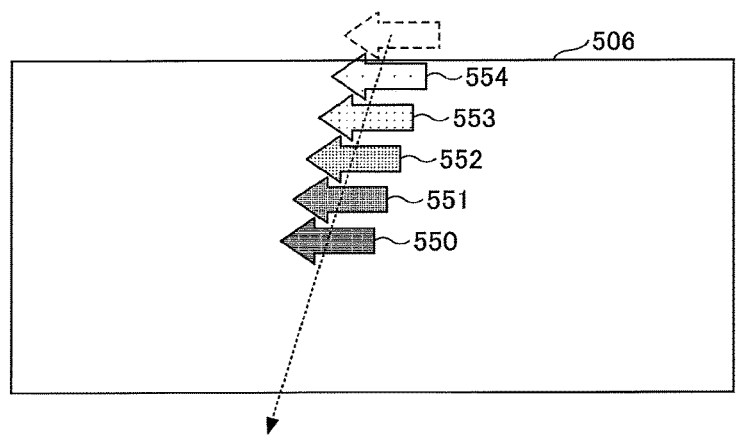
FIG. 11 is an illustration for explaining how the target object changes its display form from the time when entering the display area.

Referring to FIG. 11, operation of determining a display form of the target object since a time when the target object enters the display area, is described according to another embodiment. FIG. 11 is an illustration for explaining operation of determining a display form of the target object when entering the display area.

In this example, from the time when the displaying unit 14 starts displaying the target object in the display area 506, the determiner 13 of the display apparatus 10 starts changing the display form of the target object in the display area 506. That is, the display form of the target object gradually changes, from the display form 554 to the display form 550, as the target object moves at a constant speed. The display form 554 is the display form that can easily be perceptible to the user, and the display form 550 is the display form that can hardly be perceptible to the user. For example, the display form 554 has a transparency of 0%, and the display form 550 has a transparency of 70%. If the target object starts changing the display form from the time when the target object appears in the display area 506 according to the distance between the current display location and the border of the display area 506, a time it takes for the target object to move to the border of the display area 506 would be the same for all objects, irrespective of the movement speed or movement direction of each target object.

Figure 12:
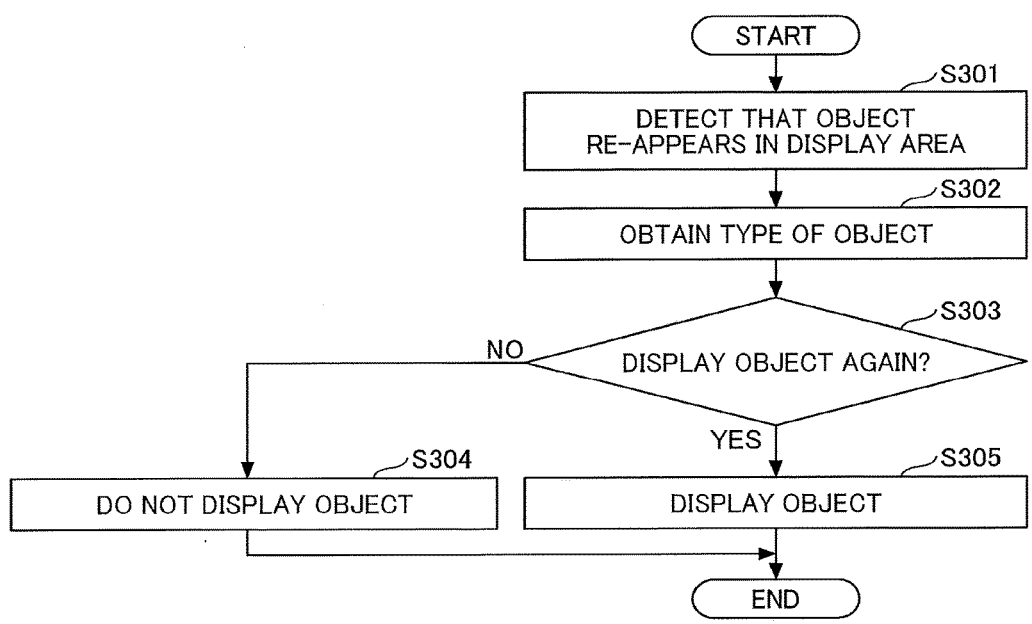
FIG. 12 is a flowchart illustrating operation of determining a display form of the target object, when the target object re-appears in the display area after it has disappeared from the display area.
Figure 13A:
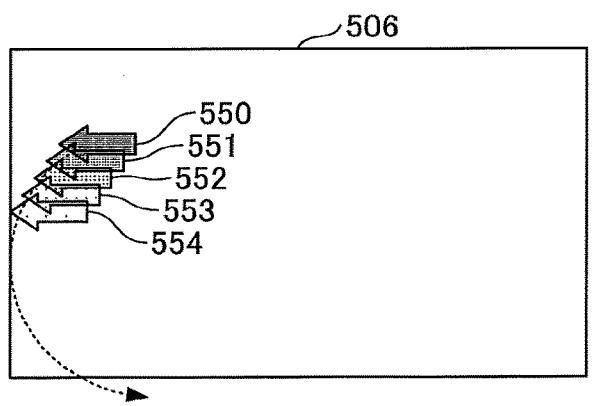
FIG. 13A is an illustration for explaining operation of not displaying the target object again, after it has disappeared from the display area.
Figure 13B:
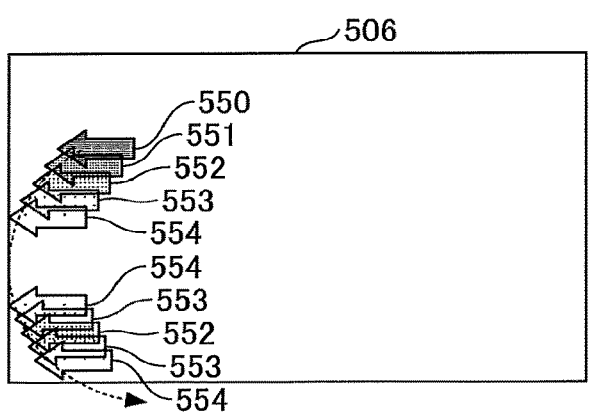
FIG. 13B is an illustration for explaining operation of displaying the target object again, after it has disappeared from the display area.

Next, referring to FIGS. 12, 13A and 13B, operation of determining a display form of the target object, which re-appears in the display area after it has disappeared from the display area, according to an embodiment. FIG. 12 is a flowchart illustrating operation of determining a display form of the target object, when the target object re-appears in the display area after it has disappeared from the display area. FIGS. 13A and 13B are illustrations for explaining display forms of the target object, when the target object moves within the display area 506 after it has disappeared from the display area 506.

For example, depending on the turning angle of the wheel, the target object may disappear from the display area 506. In such case, the display apparatus 10 determines whether to display or not to display the target object again, based on a type of the target object.

At S301, the determiner 13 of the display apparatus 10 detects that the target object re-appears in the display area 506 after it has disappeared from the display area 506.

The obtainer 11 of the display apparatus 10 obtains a type of the target object, which reappeared, from the ECU 20 (S302). The type of the target object may be selected from, for example, the vehicle, pedestrian, and guide.

The determiner 13 of the display apparatus 10 determines whether the target object is to be displayed, based on the type of the object that is obtained at the obtainer 11 (S303). For example, if the target object has information that is high in its importance, the determiner 13 determines to display the target object again (S305).

When it is determined not to display the target object ("NO" at S303), the displaying unit 14 does not display the target object (S304).

FIG. 13A illustrates the example case in which the target object is not to be displayed again. In such case, the target object is not displayed in the display area 506, even when the current location of the target object is within the display area 506. Since the target object, which is less important, does not re-appear in the display area 506, the driver is able to focus on other information. For example, if the target object is a navigation guide, the target object is not displayed again.

In FIG. 13, the display form 550 has a low transparency, and the display form 554 has a high transparency. The display forms 551, 552, and 553 increase in transparency in this order.

When it is determined to display the target object ("YES" at S303), the displaying unit 14 displays, in the display area 506, the target object in the display form (S305).

FIG. 13B illustrates the example case in which the target object is to be displayed again. In such case, the target object to be displayed again is displayed in the display form, which is the same as a display form of the target object when entering the display area 506 or when disappearing from the display area 506. The target object, which is highly important, is displayed again to the driver.

For example, it is assumed that the target object, which has disappeared from the display area 506 as the vehicle turns, again enters in the display area 506 due to a steering of the vehicle. In such case, the determiner 13 of the display apparatus 10 may cause the target object be displayed in the display area 506. For example, in case the driver turns the wheel in one direction to avoid collision with obstacle, but again turns the wheel back in other direction toward the obstacle, the display apparatus 100 displays the target object, which is the obstacle, in the display area 506. For example, if the target object is any one of the vehicle or pedestrian, such target object is displayed again.

In FIG. 13B, the display form 550 has a low transparency, and the display form 554 has a high transparency. The display forms 551, 552, and 553 increase in transparency in this order. When re-entering the display area 506, the target object has the display form 554, which is the same as the display form 554 when the target object disappears from the display area 506.

Figure 14A:
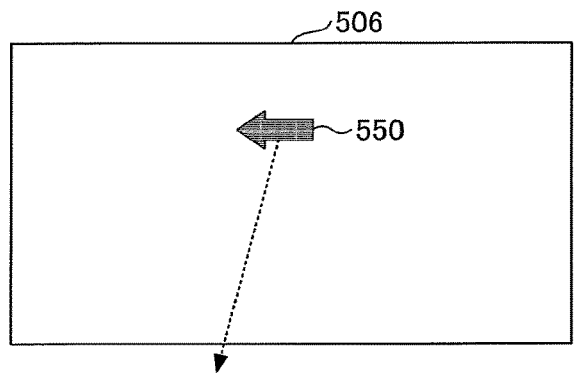
FIGS. 14A to 14C are illustrations for explaining display control of the target object that re-appears in the display area after it has disappeared from the display area.
Figure 14B:
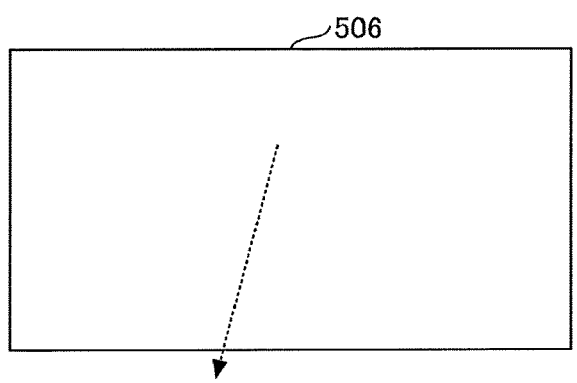
Figure 14C:
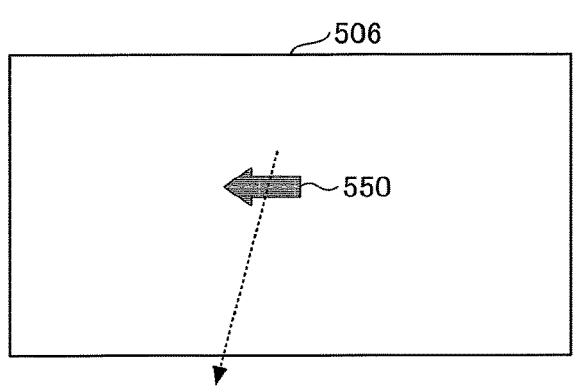

Referring to FIGS. 14A, 14B, and 14C, operation of determining a display form of the target object, when the target object accidentally disappears from the display area 506, for example, due to disturbance to the vehicle, is described according to an embodiment.

In the above-described example referring to FIGS. 13A and 13B, the target object disappears or re-appears in the display area 506, according to operation by the driver such as accelerating and steering. In such case, the target object is displayed in the display form, which is similar to the display form to be displayed when the target object appears in the display area or when the target object disappears from the display area.

Alternatively, the target object may disappear from the display area, or re-appear in the display area, according to any other factor such as disturbance to the vehicle.

Examples of disturbance include, but not limited to, vehicle vibration caused by a rough road surface. In order to keep reality in AR, the display location of the target object also changes with the rough road surface.

That is, the display apparatus 10 controls display of the target object to be in synchronous with the scenery in the real world, based on the pitch and roll of the vehicle obtained from the ECU 20. The pitch and roll of the vehicle may be obtained from an inclination sensor mounted in the vehicle.

In such case, when the vehicle bounds, some real objects may disappear from the display area 506. Similarly, as illustrated in FIGS. 14A and 14B, the target object, which is the virtual object, that has been displayed in the display area 506 (FIG. 14A) disappears from the display area 506 (FIG. 14B). After that, as illustrated in FIG. 14C, the target object re-appears in the display area 506 with the display form 550, which is the same as the display form 550 that is previously displayed. FIG. 14A illustrates a case in which the target object is displayed in the display form 550, when the vehicle normally drives. FIG. 14B illustrates a case in which the target object disappears from the display area 506, as the vehicle bounds. FIG. 14C illustrates a case in which the target object re-appears in the display area 506 in the display form 550, when the vehicle normally drives again after the vehicle bounds.

In one or more embodiments described above, transparency of the target object is changed to make the target object perceptible or not perceptible to the user. Alternatively, an area of the target object that can be seen from the user can be made smaller over time.

Figure 15:
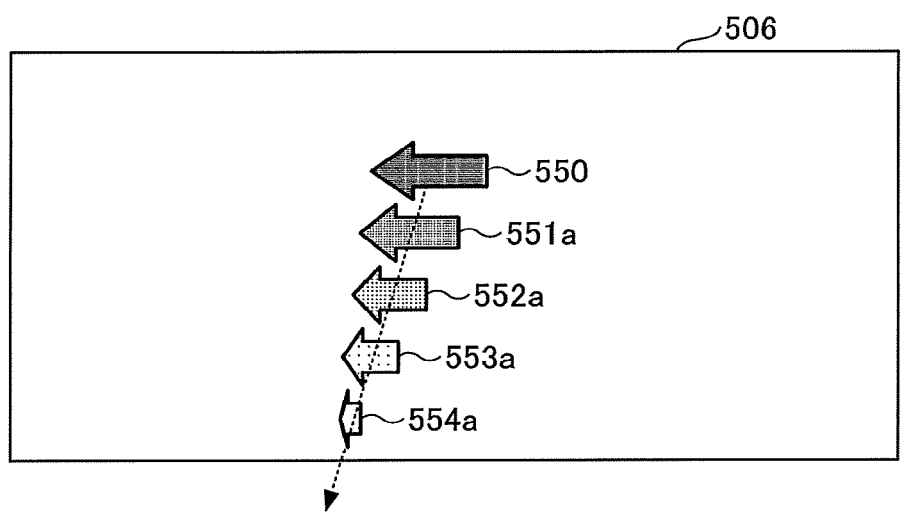
FIG. 15 is an illustration for explaining the change in display size of the target object over time.

FIG. 15 is an illustration for explaining the change in area size of the target object that can be seen from the user. In this example illustrated in FIG. 15, the target object rotates about a vertical axis while the target object moves toward the border of the display area 506. With this rotation, an area of the target object that can be seen from the user in the direction of movement (that is, the direction of traveling) decreases. For example, the determiner 13 may change a rotation angle of the target object with respect to a surface of the display area, according to the time it will take for the target object to move to the border of the display area 506. In FIG. 15, the target object having the display form 550 has a rotation angle of 0 degree with respect to the surface of the display area 506. The target object having the display form 551*a* has a rotation angle greater than 0 degree, such that an area that can be seen from the user in the traveling direction decreases in size. In a substantially similar manner, the target object having the display form 554*a* has a rotation angle close to 90 degrees, such that an area that can be seen from the user in traveling direction greatly decreases. While this example shows the case in which the target object rotates in clockwise direction about the vertical axis, the target object may rotate in any direction about any axis. That is, the target object any rotate in counterclockwise direction, or along a horizontal axis.

In one or more embodiments described above, it is assumed that the display apparatus 10 implements the functions of the obtainer 11, the calculator 12, the determiner 13, and the displaying unit 14. Alternatively, any combination of the above-described functions may be implemented by a plurality of computers. For example, the determiner 13 and the calculator 12 may be implemented by one or more computers that operate as a server. Such server may reside on a cloud network, or a network at a service center.

Further, while the target object to be displayed on the display area is referred to as the virtual object in one or more embodiments, such object may be alternatively referred to as an AR object.

Further, the present invention may reside in a non-transitory recording medium storing a plurality of instructions which, when executed by one or more processors, cause the processors to perform a display control method including: obtaining a display location and a movement direction of a virtual object to be displayed in a display area of the display apparatus so as to be overlaid in a real world, the virtual object to be moved relative to movement of the mobile object; estimating a time it will take for the virtual object to move from the display location to a border of the display area, or a distance between the display location of the virtual object and the border of the display area, each based on the display location and the moving direction of the virtual object; determining a display form of the virtual object based on the estimated time or the estimated distance; and displaying the virtual object in the determined display form, such that the virtual object changes the display form while moving in the display area.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A display apparatus mountable on a mobile object, the display apparatus comprising:
   circuitry configured to
   obtain a display location and a movement direction of a virtual object to be displayed in a display area of the display apparatus so as to be overlaid in a real world, the virtual object to be moved relative to movement of the mobile object;
   estimate a time it will take for the virtual object to move from the display location to a border of the display area, or a distance between the display location of the virtual object and the border of the display area, each based on the display location and the moving direction of the virtual object, wherein the circuitry is further configured to estimate the time it will take for the virtual object to move to the border of the display area based on an acceleration speed of the mobile object;
   determine a display form of the virtual object based on the estimated time or the estimated distance; and
   cause the virtual object be displayed in the determined display form, such that the virtual object changes the display form while moving in the display area.

2. The display apparatus of claim 1,
   wherein the circuitry is further configured to change the display location of the virtual object from a first display location to a second display location over time, the second display location being closer to the border of the display area than the first display location, and
   the circuitry is further configured to determine display forms of the virtual object at the first display location and the second display location, such that a second display form of the virtual object at the second display location is not perceptible to a user compared to a first display form of the virtual object at the first display location.

3. The display apparatus of claim 2,
   wherein the second display form of the virtual object at the second display location has a transparency higher than that of the first display form of the virtual object at the first display location.

4. The display apparatus of claim 2,
   wherein the second display form of the virtual object at the second display location has a greater rotation angle with respect to a surface of the display area, than that of the first display form of the virtual object at the first display location.

5. The display apparatus of claim 1,
   wherein the circuity is further configured to calculate the movement direction of the virtual object, according to the display location of the virtual object, a movement speed of the mobile object, and a turning angle of the mobile object.

6. The display apparatus of claim 1,
   wherein, when the display location of the virtual object changes according to an inclination of the mobile object, the circuitry is further configured to determine the display form of the virtual object at the changed display location to be a same as a display form that was displayed before the change of the display location.

7. The display apparatus of claim 1,
   wherein, when the virtual object once disappears from the display area, the circuitry is further configured to not display the virtual object in the display area even when a new display location of the virtual object is within the display area.

8. The display apparatus of claim 1,
   wherein, when the virtual object once disappears from the display area, the circuitry is further configured to determine whether to display the virtual object in the display area when a new display location of the virtual object is within the display area, based on a type of the virtual object.

9. The display apparatus of claim 1,
wherein, when the virtual object once disappears from the display area according to first steering made by a user, the circuitry is further configured to determine to display the virtual object in the display area again, when a new display location of the virtual object is within the display area according to second steering that cancels out the first steering.

10. The display apparatus of claim 1, further comprising:
an image former to form an image of the virtual object with a projection light projected onto a transmission and reflection member, or a light emitted from a light emitting element.

11. The display apparatus of claim 1, wherein the circuitry is further configured to calculate the distance within the display area from the display location to the border of the display area in units of pixels within the display area.

12. A display system, comprising:
the display apparatus of claim 5; and
a transmitter to transmit the location of the virtual object, the movement speed of the mobile object, and the turning angle of the mobile object to the display apparatus.

13. A display system, comprising:
a display apparatus mountable on a mobile object to display a virtual object in a display area so as to be overlaid in a real world; and
a server communicable with the display apparatus, the server including circuitry configured to
obtain a display location and a movement direction of the virtual object, the virtual object to be moved relative to movement of the mobile object;
estimate a time it will take for the virtual object to move from the display location to a border of the display area, or a distance between the display location of the virtual object and the border of the display area, each based on the display location and the moving direction of the virtual object, wherein the circuitry is further configured to estimate the time it will take for the virtual object to move to the border of the display area based on an acceleration speed of the mobile object;
determine a display form of the virtual object based on the estimated time or the estimated distance; and
cause the display apparatus to display the virtual object in the determined display form, such that the virtual object changes the display form while moving in the display area.

14. A display control method for controlling display of a display apparatus mountable on a mobile object, the method comprising:
obtaining a display location and a movement direction of a virtual object to be displayed in a display area of the display apparatus so as to be overlaid in a real world, the virtual object to be moved relative to movement of the mobile object;
estimating a time it will take for the virtual object to move from the display location to a border of the display area, or a distance between the display location of the virtual object and the border of the display area, each based on the display location and the moving direction of the virtual object, wherein the estimating step comprises estimating the time it will take for the virtual object to move to the border of the display area based on an acceleration speed of the mobile object;
determining a display form of the virtual object based on the estimated time or the estimated distance; and
displaying the virtual object in the determined display form, such that the virtual object changes the display form while moving in the display area.

* * * * *